US008701151B2

(12) United States Patent
Jung et al.

(10) Patent No.: US 8,701,151 B2
(45) Date of Patent: Apr. 15, 2014

(54) METHOD OF DOWNLOADING TERRESTRIAL DMB DATA USING MULTI-DOWNLOAD ALGORITHM AND AN APPARATUS THEREOF

(75) Inventors: Ji-Wuck Jung, Suwon-si (KR); Young-Jip Kim, Suwon-si (KR); Byoung-Dai Lee, Seongnam-si (KR); Hyun-Chul Kim, Suwon-si (KR)

(73) Assignee: Samsung Electronics Co., Ltd., Yeongteng-gu, Suwon-si, Gyeonggi-do (KR)

( * ) Notice: Subject to any disclaimer, the term of this patent is extended or adjusted under 35 U.S.C. 154(b) by 1387 days.

(21) Appl. No.: 11/489,903

(22) Filed: Jul. 20, 2006

(65) Prior Publication Data

US 2007/0081531 A1 Apr. 12, 2007

(30) Foreign Application Priority Data

Oct. 12, 2005 (KR) ........................ 10-2005-0096085

(51) Int. Cl.
*H04J 99/00* (2009.01)
*H04N 7/173* (2011.01)

(52) U.S. Cl.
USPC ............ 725/115; 725/116; 725/131; 370/546

(58) Field of Classification Search
None
See application file for complete search history.

(56) References Cited

U.S. PATENT DOCUMENTS

| | | | | |
|---|---|---|---|---|
| 5,630,119 | A * | 5/1997 | Aristides et al. | 707/1 |
| 6,522,342 | B1 * | 2/2003 | Gagnon et al. | 715/716 |
| 2003/0025832 | A1 * | 2/2003 | Swart et al. | 348/461 |
| 2005/0083932 | A1 * | 4/2005 | Lee et al. | 370/390 |
| 2005/0232136 | A1 * | 10/2005 | Kwak | 370/208 |

FOREIGN PATENT DOCUMENTS

| | | | |
|---|---|---|---|
| CN | 1607750 | 4/2005 | H04H 1/00 |
| CN | 1671191 | 9/2005 | H04N 5/44 |
| KR | 2001-3826 | 1/2001 | H04L 12/40 |
| KR | 2005-52859 | 6/2005 | H04N 7/00 |
| KR | 2006-72156 | 6/2006 | H04N 7/00 |
| KR | 2006-73069 | 6/2006 | H04N 7/00 |
| KR | 2007-21712 | 2/2007 | H04N 7/00 |

OTHER PUBLICATIONS

Digital Audio Broadcasting: Principles and Applications of Digital Radio By Wolfgang Hoeg, Thomas Lauterbach ISBN # 0470850132 Published by John Wiley and Sons, 2003.*
NuriMedia Company Lmtd.; "The Technology and Standard of Terrestrial Digital Multimedia Broadcasting;".

* cited by examiner

*Primary Examiner* — Mark D Featherstone
(74) *Attorney, Agent, or Firm* — Cha & Reiter, LLC

(57) ABSTRACT

Disclosed is an apparatus and method for downloading terrestrial DMB data using a multi-download algorithm. The multi-download algorithm enables the terrestrial DMB receiving apparatus to download and store the data service data in advance from the ensemble consisting of the video service data, the audio service data, and the data service data while enjoying the video or audio service, so that the DMB subscriber can be quickly provided with the data service data whenever needed later.

12 Claims, 4 Drawing Sheets

METHOD OF DOWNLOADING TERRESTRIAL DMB DATA USING MULTI-DOWNLOAD ALGORITHM AND AN APPARATUS THEREOF

CLAIM OF PRIORITY

This application claims the benefit of the earlier filing date, pursuant to 35 U.S.C. §119, to that patent application entitled "Method of Downloading Terrestrial DMB Data Using a Multi-Download Algorithm and An Apparatus Thereof," filed in the Korean Intellectual Property Office on Oct. 12, 2005 and assigned Serial No. 2005-96085 the contents of which are incorporated herein by reference.

BACKGROUND OF THE INVENTION

1. Field of the Invention

The present invention relates a method of providing data services in a terrestrial DMB system, and more particularly to a method of downloading and executing data service data through a terrestrial DMB system. Hereinafter, the term "data service" is used as distinguished from video and audio data service.

2. Description of the Related Art

The terrestrial DMB system is to transmit video services, audio services, and data services. It enables each broadcasting station to transmit an ensemble containing video service, audio service, and data service, each of which services consists of one or more service components. In order to transmit such information, the DMB system is composed of a transmission frame, which is illustrated in FIG. 1.

A conventional DMB transmission frame, with reference to FIG. 1, includes a synchronization channel 11 for transmitting internal information of the DMB transmission system, a fast information channel (FIC) 12 allocated for transmitting information requiring quick access by the DMB receiver, and a main service channel (MSC) 13 for transmitting main services like service components.

More specifically describing each channel, the synchronization channel 11 for transmitting the internal information of the DMB transmission system includes the information of transmission frame synchronization, automatic frequency control, channel state estimation, and transmission identification.

The FIC 12 comprises a plurality of fast information blocks (FIBs) 101-1 to 101-n, containing the multiplex configuration information (MCI) on the structure of the ensemble, the service information (SI) on the services in the ensemble, and other data requiring quick transmission.

The MSC 13 is used for transmitting service components such as video component, audio component and data component. It again consists of a plurality of sub-channels each coded in convolution. The sub-channels consist of a plurality of common interleaved frame (CIFs) 102-1 to 102-n.

The structure and length of the transmission frame varies with transmission mode, but the DMB system adopts the FIBs 101-1 to 101-n and CIFs 102-1 to 102-n in order to provide a transmission mode not affected by the kinds of the data transmitted through the FIC 12 and MSC 13. Namely, the data is transmitted using the FIBs 101-1 to 101-n and CIFs 102-1 to 102-n regardless of the transmission mode. It is only necessary to specify the number of the FIBs 101-1 to 101-n and CIFs 102-1 to 102-n inputted according to the transmission mode. Table 1 shows the number of FIBs and CIFs specified according to the transmission modes of the terrestrial DMB system.

TABLE 1

| Transmission Mode | Length of Transmission Frame | Number of FIBs Per Transmission Frame | Number of CIFs Per Transmission Frame |
|---|---|---|---|
| I | 96 ms | 12 | 4 |
| II | 24 ms | 3 | 1 |
| III | 24 ms | 4 | 1 |
| IV | 48 ms | 6 | 2 |

In addition, Table 2 shows an example of the services planned to be provided by the terrestrial DMB system in the Republic of Korea.

TABLE 2

| Name of Company | Plan of Channel Structure Channel-Broadcast Type-Transmission Capacity | Operational Method | Field of Broadcasting |
|---|---|---|---|
| KBS | KBS-Mobile 1-TV-548k | Direct Operation | Versatile Program |
| | KBS-Mobile 3-Radio-128k | Direct Operation | Music |
| | KMMB-R-Radio-128k | Rent (KMMB) | Daily Economy |
| | OZIC-Radio-128k | Rent (CJ Media) | Music |
| | KBS-Mobile 5-Data-220k | Direct Operation | Versatile Program |
| MBC | MBC DMB TV-TV-548k | Direct Operation | Versatile Program |
| | MBC DMB Radio-Radio-128k | Direct Operation | Versatile Program |
| | MBN Economy Radio-Radio-128k | Rent (MBN) | Economy |
| | ARIRANG English Radio-Radio-128k | Rent (International Broadcasting Exchange Foundation) | Korean Culture |
| | MBC DMB Data-Data-220k | Direct Operation | Versatile Program |
| SBS | SBS DMB TV-TV-544k | Direct Operation | Versatile Program |

TABLE 2-continued

| Name of Company | Plan of Channel Structure Channel-Broadcast Type-Transmission Capacity | Operational Method | Field of Broadcasting |
|---|---|---|---|
| | SBS DMB Radio-Radio-128k | Direct Operation | Versatile Program |
| | TBS DMB Radio-Radio-128k | Rent (TBS-Seoul) | Traffic |
| | KYUNGGI DMB-Radio-Radio-128k | Rent (Kyunggi Broadcasting) | Culture and Art |
| | HANGYEORAI DMB Data-Data-96k | Rent (Hangyeorai Newspaper | Career and Education |
| | LGT DMB Data-Data-96k | Rent (LG Telecom) | Leisure and Entertainment |
| | SBS DMB Data-Data-32k | Direct Operation | New Technologies, New Services, Development/Experiment (Versatile Program) |

Describing an ensemble in connection with the MBC in Table 2, the service structure of the ensemble used by the MBC consists of one video service, three audio services, and one data service. Thus, the DMB system features a basic broadcast signal loaded with multiple services such as video, audio and data services.

The data service may be BWS (Broadcast Web Site), EPG (Electronic Program Guide), Slide Show, or Download Java Application, etc. In order to receive a data service, the DMB subscriber may use the data for the data service (hereinafter referred to as "data service data") loaded in the broadcast signal transmitted through the DMB system. In this case, the DMB system provides only one-way communication services broadcast from the broadcasting station to the DMB receiver. Thus, the DMB receiver cannot distinguish the beginning and ending of a received data service data, or to selectively receive a part of the data service data that has not been received. Hence, this problem is resolved by the broadcasting station repeatedly transmitting the same data with a given period.

The protocols used for transmitting data in the terrestrial DMB system may be generally divided into three different protocols. The first is MOT (Multimedia Object Transfer) protocol, which is most used for transmitting file-type data. This enables a file containing the data and a header or directory containing the information of the file to be transmitted together, so that the DMB receiver can correctly receive the MOT data by using the header or directory. Examples of the data services using the MOT protocol are BWS, EPG, Slide Show, etc. The second is TDC (Transparent Data Channel) protocol, which is most used for transmitting continuous data such as data stream, e.g., TPEG (Transport Protocol Expert Group). And the third is IP (Internet Protocol) tunneling protocol, which is used or transmitting IP data.

When the DMB subscriber selects the data service, the DMB receiving terminal begins to download the data contained in the ensemble broadcast, so that the user must wait until the download is complete before enjoying the service after selection of the data service. Namely, the data service can only be executed after downloading all the data service data, and therefore the subscriber must wait for the time taken for the downloading to complete. For example, if the DMB subscriber selects a BWS service, the subscriber must wait until the DMB receiving terminal has downloaded all the file information included in the selected service. Assuming that the time required for downloading all the data contained in a BWS service be 3 minutes, then the subscriber must wait at least 3 minutes after selection of the service before enjoying the selected service. This is a source of inconvenience for the user which the user may not accept and, hence, reject further use of the service.

SUMMARY OF THE INVENTION

The present invention provides a method and apparatus for downloading terrestrial DMB data using a multi-download algorithm for a terrestrial DMB system, which enables the DMB subscriber to download the data service data from an ensemble broadcast and store the data service data while enjoying the video or audio service contained in the ensemble, so that the subscriber can immediately enjoy the data service when desired.

According to an aspect of the present invention, an apparatus for downloading terrestrial DMB data using a multi-download algorithm, comprises an ensemble analyzer for analyzing an ensemble of services constituting broadcast signals into separate MCI/SI (Multiplex Configuration Information/Service Information), video service data, audio service data, and data service data, which is included in the ensemble, an MCI/SI parser for parsing the MCI/SI and analyzing the information regarding the services constituting the ensemble, video and audio decoders for decoding the video and audio service data, respectively, to reproduce the video and audio, a data decoder for decoding the data service data, and a local cache memory for storing the decoded data service data from the data decoder, wherein the ensemble analyzer transfers the data service data detected during reproduction of the video or audio to the data decoder to decode the data stored in the local cache memory.

According to another aspect of the present invention, a method of downloading terrestrial DMB data using a multi-download algorithm, comprises the steps of outputting the video or audio service selected by a DMB subscriber, checking whether the ensemble providing the selected video or audio service includes data service data, and downloading the data service data, wherein the data service data is decoded according to the data format and stored.

BRIEF DESCRIPTION OF THE DRAWINGS

The above features and advantages of the present invention will become more apparent from the following detailed description when taken in conjunction with the accompanying drawing in which.

DETAILED DESCRIPTION OF THE INVENTION

Figure 1:
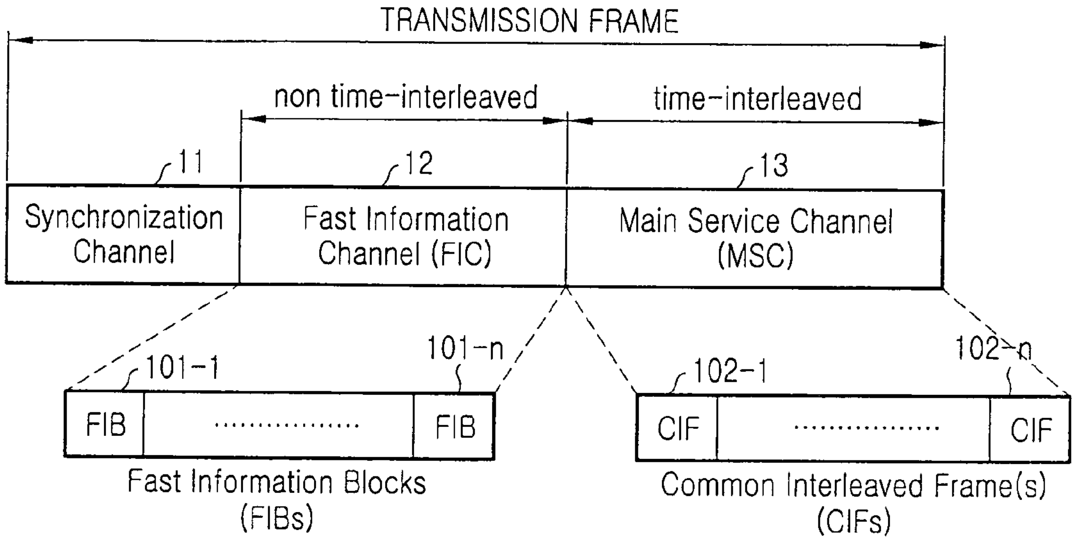
FIG. 1 is a schematic diagram for showing the structure of an example of the DMB transmission frame in the conventional DMB system.

Embodiments of the present invention will be described herein below with reference to the accompanying drawings. In the drawings, the same or similar elements are denoted by the same reference numerals even though they are depicted in different drawings. For the purposes of clarity and simplicity, well-known functions or constructions are not described in detail since they would obscure the invention in unnecessary detail.

Figure 2:
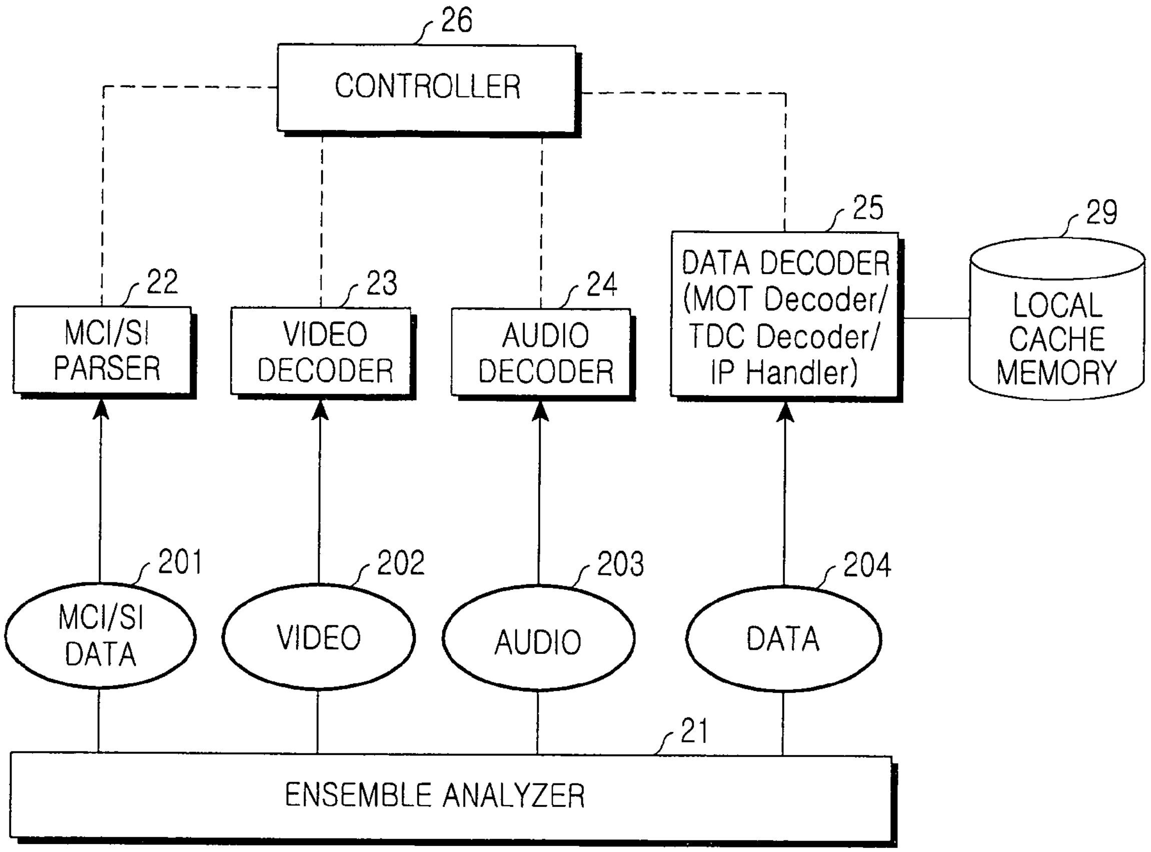
FIG. 2 is a block diagram for illustrating the structure of an example of a DMB receiving terminal used for the inventive method of downloading the terrestrial DMB data using a multi-download algorithm.

Referring to FIG. 2, the DMB receiving apparatus used for the method of downloading the terrestrial DMB data using a multi-download algorithm comprises an ensemble analyzer 21 for analyzing broadcast signal ensembles to separate embedded MCI/SI 201, video service data 202, audio service data 203, and data service data 204 included in the ensemble, an MCI/SI parser 22 for parsing the MCI/SI 201 to analyze the information regarding the services constituting the ensemble, a video decoder 23 for decoding the video service data 202 separated by the ensemble analyzer 21 to reproduce the video, a audio decoder 24 for decoding the audio service data 203 separated by the ensemble analyzer 21 to reproduce the audio, a data decoder 25 for decoding the data service data 204 separated by the ensemble analyzer 21 according to the data format, and a local cache memory 29 for storing the decoded data service data from the data decoder 25 in order to immediately output the data when needed.

Also provided is a controller 26 for enabling the DMB subscriber to selectively operate the MCI/SI parser 22, video decoder 23, audio decoder 24, or data decoder 25. The invention concept described herein enables the DMB subscriber to download the data service data from the ensemble being broadcast and store it in the local cache memory 29 regardless of the kind of the services being enjoyed by the subscriber. Thus, if the DMB subscriber selects the data service from the ensemble being broadcast, the DMB receiving apparatus retrieves the data service data stored in the local cache memory 29 so as to quickly provide the data service for the subscriber.

Describing more specifically the component parts of the DMB receiving apparatus, the ensemble analyzer 21 analyzes the broadcast signal ensemble received through the DMB tuner to separate the MCI/SI 201, the video data 202 for video service, the audio data 203 for audio service, and the data service data 204 transferred to their respective decoders 22, 23, 24 and 25.

The MCI/SI parser 22 parses the MCI/SI 201 separated by the ensemble analyzer 21 to analyze the information on the services constituting the ensemble. More particularly, when the video or audio service is selected, the MCI/SI parser 22 parses and analyzes the MCI/SI 201 to check whether the ensemble carries the data service data. To this end, the MCI/SI parser 22 analyzes the SI coming through the FIC to determine the kind of the data service data contained in the ensemble, and to find the information necessary for downloading the data service data from the ensemble.

The video decoder 23 and audio decoder 24 decode the video and audio data, respectively, separated by the ensemble analyzer 21 according to the DMB subscriber's selection.

The data decoder 25 decodes the data service data separated by the ensemble analyzer 21, and stores it in the local cache memory 29. In this case, the data service data may be MOT data, TDC data, and/or IP data, which are decoded respectively by the MOT decoder, TDC decoder, and IP handler.

Figure 3:
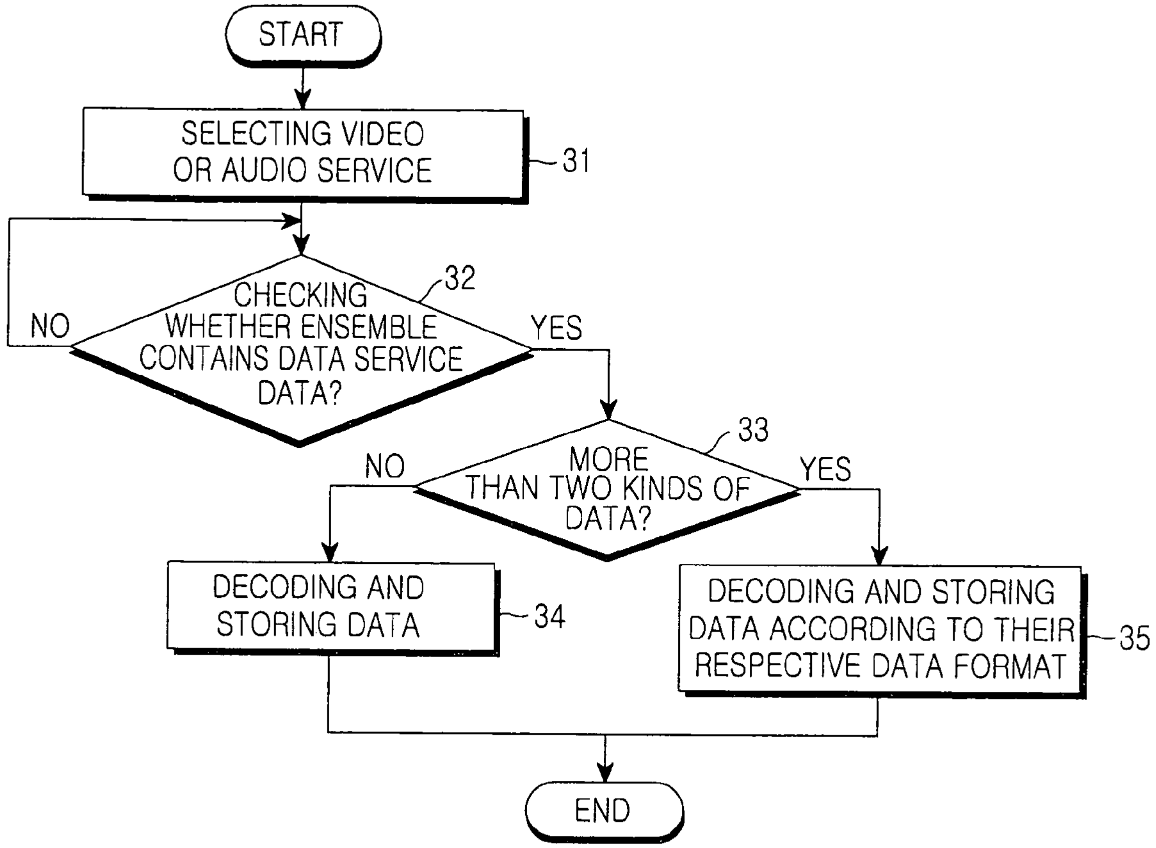
FIG. 3 is a flowchart for illustrating the steps of downloading the terrestrial DMB data using a multi-download algorithm according to an embodiment of the present invention.

Describing the method of downloading the terrestrial DMB data using the multi-download algorithm with reference to FIG. 3, firstly the DMB subscriber selects the video or audio service output from the ensemble in step 31. Then a check is performed whether the ensemble contains the data service data in step 32. In this case, whether the ensemble contains the data service or not may be discovered by analyzing the MCI/SI. More specifically, the MCI/SI parser 22, as shown in FIG. 2, analyzes the service information coming through the FIC so as to determine the kind of data service data in the ensemble, and to discover the information necessary for downloading the data service data.

Generally the information on the data service data in the ensemble is transferred through the extension type No. 13 of the FIG group type No. 0 (FIG. 0/13). Thus the DMB receiving apparatus determines the kind of the data service data in the ensemble, the service identifier, the service component identifier within the service, etc. Using the information obtained through FIG. 0/13, the MCI/SI parser 22 also analyzes the FIG. 0/2, FIG. 0/3 and FIG. 0/8 defining the service and service component in the MCI contained in the fast channel information so as to obtain the sub-channel ID and packet address necessary for downloading the data. In this embodiment, the information types of the FIG. 0/13, FIG. 0/2, FIG. 0/3 and FIG. 0/8 are conventionally used in the terrestrial DMB system, and therefore need not be described in detail herein.

Further, if the data service data is not detected, a check is performed periodically to determine whether the data service data is contained in the ensemble (32). When the data service data is detected, the data is decoded and stored according to the data format (33, 34, and 35). More specifically a check is made to determine whether the data service data consists of more than two kinds in step 33. Here, more than two kinds of data services can be contained in one ensemble. For example, in the terrestrial DMB system in the Republic of Korea (Table 2), SBS ensemble consists of three kinds of data services, HANGYEORAI DMB Data-Data-96k, LGT DMB Data-Data-96k and SBS DMB Data-Data-32k. In this case, each data of data services is decoded and stored according to their respective data formats. If the data service data consists of only one kind, the data is decoded and stored according to the data format in step 34. Otherwise, if it is determined that there are more than two kinds, each data is decoded and stored according to their respective data formats in step 35.

Thus, the multi-download algorithm enables the terrestrial DMB receiving apparatus to download the data service data in advance from the ensemble even while receiving the video or audio service, so that the DMB subscriber can be quickly provided with the data service data whenever needed. Moreover, it is possible to effectively receive and enjoy the DMB signal containing the data for varies services.

Figure 4:
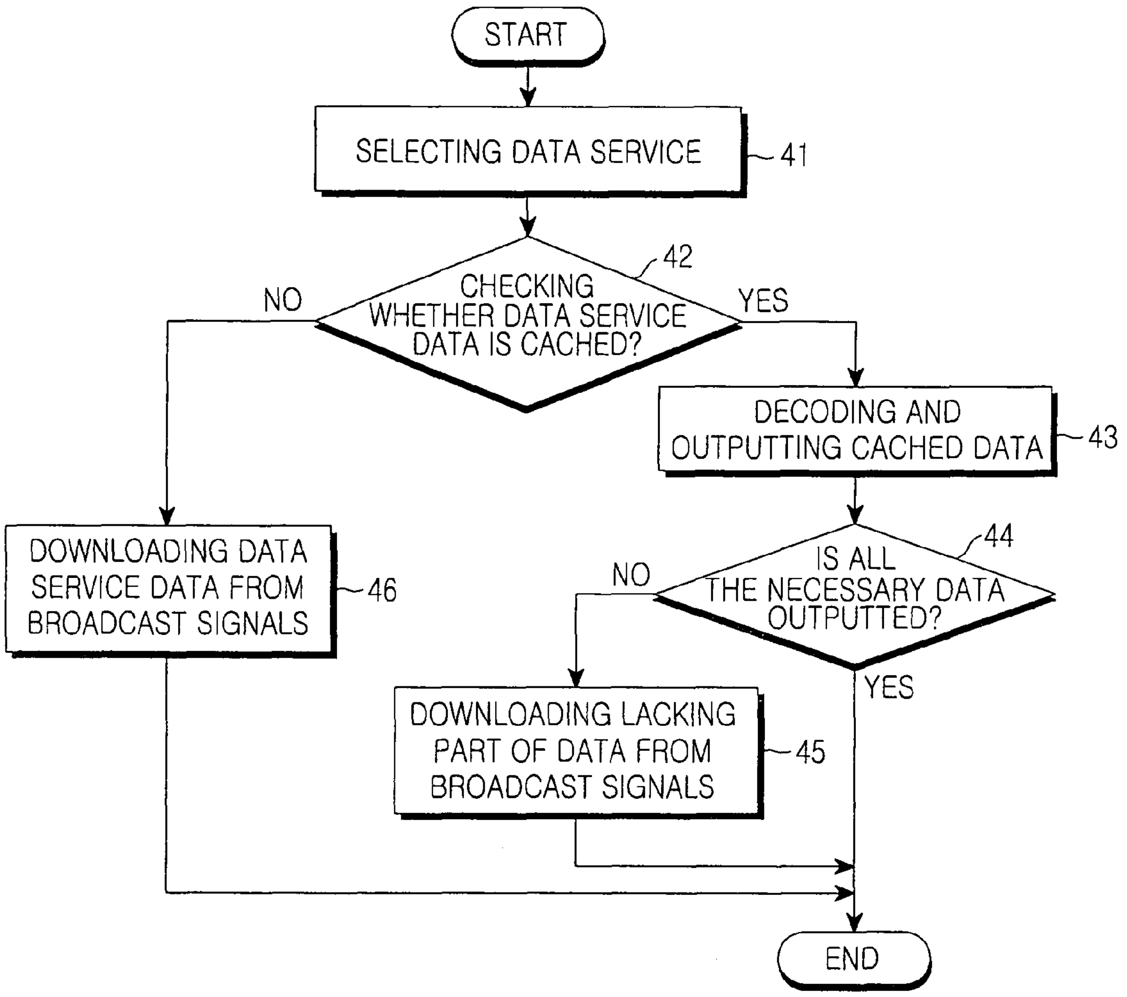
FIG. 4 is a flowchart for illustrating the process of treating the data service when applying the method of downloading the terrestrial DMB data using a multi-download algorithm according to the present invention.

Describing the process of downloading the terrestrial DMB data using the multi-download algorithm according to the invention, with reference to FIG. 4, when a data service is selected in step 41, it is checked in step 42 whether the local cache memory 29 stored the data service data. When detecting the data service data, the cached data is loaded and outputted in step 43. In this case, if the cached data lacks a part of the necessary data for the service in step 44, the missing part is downloaded from the broadcast signals in step 45. Otherwise, when the local cache memory 29 does not contain the data service data, the data service data is downloaded from the broadcast signals in step 46.

Thus, because the data service data is cached in advance, the DMB subscriber can receive the data service quickly whenever needed. In addition, if a particular data item is lacking, the particular data item can be downloaded from the broadcast signals, thereby increasing the total speed of providing the data service.

The method can be embodied in a computer program that is stored in a medium, such as CD-ROM, RAM, floppy disc, hard disc, and optomagnetic disc, or downloaded via a network, e.g., the internet. As described above, the multi-download algorithm enables the terrestrial DMB receiving apparatus to download in advance the data service data from the ensemble even while receiving the video or audio service, so that the DMB subscriber can be quickly provided with the data service data whenever necessary. Moreover, it is possible to effectively receive and enjoy the DMB signal containing the data for a variety of services.

While the invention has been shown and described with reference to a certain preferred embodiment thereof, it will be understood by those skilled in the art that various changes in form and details may be made therein without departing from the spirit and scope of the invention.

What is claimed is:

1. An apparatus for downloading terrestrial DMB data using a multi-download algorithm, comprising:

an ensemble analyzer for analyzing an ensemble constituting broadcast signals to separate MCI/SI(Multiplex Configuration Information/Service Information), video service data, audio data, and data service data included in said ensemble;

an MCI/SI parser for parsing the MCI/SI to analyze the information on the services constituting said ensemble;

a video/audio decoder for decoding the video/audio service data to reproduce the video/audio;

a data decoder for decoding the data service data separated by said ensemble analyzer; and a local cache memory for;

storing the decoded data service data from said data decoder, wherein said ensemble analyzer transfers the data service data detected during reproduction of the video or audio; and outputting the decoded data service data when a DMB subscriber selects a data service from the ensemble, the decoded data service data is output from said local cache memory and the rest of the decoded data service data not in the local cache memory are downloaded from the terrestrial DMB data in response to a subscriber's data request.

2. The apparatus as defined in claim 1, further including a controller for enabling the DMB subscriber to selectively operate said MCI/SI parser, video/audio decoder, or data decoder.

3. The apparatus as defined in claim 1, wherein said data service is one of BWS (Broadcast Web Site), EPG (Electronic Program Guide), Slide Show, and Download Java Application.

4. The apparatus as defined in claim 1, wherein said MCI/SI parser parses said MCI/SI to analyze the information on the services constituting said ensemble, thereby checking whether said data service data is inputted through said ensemble or not.

5. The apparatus as defined in claim 1, wherein said data decoder includes MOT (Multimedia Object Transfer) decoder for decoding MOT data, TDC (Transparent Data Channel) decoder for decoding TDC data, and IP (Internet Protocol) handler for decoding IP tunneling data.

6. The apparatus as defined in claim 4, wherein if it is checked by said MCI/SI parser that said data service data is inputted, said ensemble transfers said data service data to said data decoder.

7. A method of downloading terrestrial DMB data using a multi-download algorithm, comprising the steps of:

outputting a video or audio service selected by a DMB subscriber;

checking whether the ensemble providing the selected video or audio service includes data service data;

downloading the data service data, wherein said data service data is decoded according to the data format and stored into a local cache memory; and outputting the decoded data service data when a DMB subscriber selects a data service from the ensemble, the decoded data service data is output from said local cache memory and the rest of the decoded data service data not in the local cache memory are downloaded from the terrestrial DMB data in response to a subscriber's data request.

8. The method as defined in claim 7, wherein the step of checking is performed by analyzing the MCI/SI of the ensemble.

9. The method as defined in claim 7, wherein said data service is selected from the group consisting of: BWS, EPG, Slide Show, and Download Java Application.

10. A computer program stored on a non-transitory tangible medium which when loaded into a processing system causes the processing system to perform the steps of:

separating MCI/SI (Multiplex Configuration Information/Service Information), video service data, audio service data, and data service data included in a received broadcast signal;

parsing the MCI/SI to analyze the information on the services constituting said ensemble;

decoding the video and/or audio service data to reproduce the video and/or audio;

decoding the separated data service data;

storing the decoded data service data in a local cache memory; and outputting the decoded data service data when a DMB subscriber selects a data service from the ensemble, the decoded data service data is output from said local cache memory and the rest of the decoded data service data not in the local cache memory are downloaded from the terrestrial DMB data in response to a subscriber's data request.

11. The computer program as defined in claim 10, wherein the data service is selected from the group consisting of: BWS, EPG, Slide Show, and Download Java Application.

12. The computer program as defined in claim 10, wherein the step of storing further comprises the step of:

periodically storing the separated data service data according to a data format.

* * * * *